United States Patent [19]

Kamimura et al.

[11] Patent Number: 4,919,591
[45] Date of Patent: Apr. 24, 1990

[54] WASHER PUMP FOR AUTOMOBILES

[75] Inventors: Takeshi Kamimura, Hamamatsu; Toshihiro Satoh, Toyohashi, both of Japan

[73] Assignee: ASMO Co., Ltd., Kosai, Japan

[21] Appl. No.: 360,463

[22] Filed: Jun. 2, 1989

[30] Foreign Application Priority Data

Jun. 3, 1988 [JP] Japan ............................ 63-73429[U]

[51] Int. Cl.⁵ .............................................. F01D 1/30
[52] U.S. Cl. ................................. 415/152.1; 415/911
[58] Field of Search ...................... 415/146, 152.1, 911

[56] References Cited

U.S. PATENT DOCUMENTS

| | | | |
|---|---|---|---|
| 3,257,950 | 6/1966 | Toma | 415/911 |
| 3,269,316 | 8/1966 | Toma | 415/911 |
| 3,751,179 | 8/1973 | Wassmann | 415/911 |
| 4,600,361 | 7/1986 | Bianco | 415/146 |
| 4,679,983 | 7/1987 | Pietryk et al. | 415/911 |
| 4,728,260 | 3/1988 | Ishii | 415/911 |

FOREIGN PATENT DOCUMENTS 55-48156 11/1980 Japan .
60-6096 1/1985 Japan .
62-244741 10/1987 Japan .

*Primary Examiner*—Robert E. Garrett
*Assistant Examiner*—John T. Kwon
*Attorney, Agent, or Firm*—Burns, Doane, Swecker & Mathis

[57] ABSTRACT

A washer pump for an automobile includes a substantially circular pump chamber receiving concentrically therein an impeller and having an inlet aligned with the center of the impeller and first and second outlets defined in a sidewall of the pump chamber and extending tangentially to the sidewall, and a directional control valve including a valve chamber connected in fluid communication with the pump chamber through the first outlet and also through the second outlet, and a valve element movably disposed in the valve chamber for selectively connecting the first and second outlets, respectively, to first and second washer nozzles of the automobile. The washer pump further includes a projection disposed between the first and second outlets and projecting inwardly from the sidewall of the pump chamber toward the impeller for substantially blocking the flow of a cleaning fluid between the first and second outlets, thereby increasing the pressure difference between the first and second outlets.

6 Claims, 5 Drawing Sheets

WASHER PUMP FOR AUTOMOBILES

BACKGROUND OF THE INVENTION

1. Field of the Invention

The present invention relates to a washer pump for automobiles for supplying a cleaning fluid selectively to two supply channels for washing a windshield and a rear window, for example, of an automobile.

2. Description of the Prior Art

There are known various cleaning-fluid supply systems used for washing the windshield and the rear window of a motor vehicle, and most of the known cleaning-fluid supply systems comprise two washer pumps provided one for the washing of the windshield and the other for the washing of the rear window. The known systems having two pumps are costly to manufacture and occupy a relatively large space for installation thereof. With the foregoing difficulties in view, there have been proposed improved cleaning-fluid supply systems capable of washing the windshield and the rear window selectively by utilizing a single washing pump. One of such improved systems includes a differential pressure-operated valve associated with a washer pump for switching the flow of a cleaning fluid discharged from the washer pump, as disclosed in Japanese Patent Laid-open Publication No. 60-6096. Another improved system proposed by the present inventors includes a float valve associated with a washer pump for switching the direction of flow of the cleaning fluid, as disclosed in Japanese Patent Laid-open Publication No. 62-244741. This system is simple in construction and can be manufactured less costly.

The known automobile washer pumps of the centrifugal type generally have a maximum pump efficiency of about 25% or less. This is because the centrifural washer pumps have a circular pump chamber in which an impeller is rotatably disposed with a annular clearance defined between the circular pump chamber and the impeller. The clearance is determined by the amount of the cleaning fluid to be pressurized in the pump chamber. The pressurized cleaning fluid is discharged from the pump chamber through an outlet which extends tangentially to the circular pump chamber. During that time, however, the pressurized cleaning fluid flows back to the pump chamber due to the circular shape of the pump chamber, thus lowering the efficiency of the washer pump.

Various attempts proposed reduce the clearance between the pump chamber and the impeller are known, such as disclosed in Japanese Utility Model Publication No. 55-48156, for example. The disclosed pump is a so-called single-suction pump or a so-called double-suction pump irrespective of the size of the pump and has an impeller rotatable in only one direction. The impeller is disposed in a volute casing designed so that its cross-sectional area increases constantly toward the outlet. The disclosed pump of this construction is not suited for an automobile washer pump whose impeller is rotated in either direction to force the cleaning fluid selectively to two supply channels.

Differing from the general centrifural pump described above, the washer pump for automobiles has a pump chamber which is not the same as the volute chamber or casing as disclosed in the Japanese Utility Model Publication No. 55-48156 but is of a circular shape, such as shown in Japanese Patent Laid-open Publication No. 60-6096 stated above. In the circular pump chamber, there is disposed an impeller having circumferentially spaced radial vanes with an annular space or clearance defined between the peripheral wall of the pump chamber and the periphery of the impeller. The impeller is driven to rotate in either direction so that the pump chamber has two outlets leading to two washer nozzles. The washer pump of the foregoing construction has a substantially uniform pressure characteristic in either direction, however, due to a relative low pressure difference created between the two outlets, it occurs likely that a sealing valve is not shifted in position even when the direction of rotation of the impeller is changed. Consequently, a reliable delivery of the cleaning fluid to the selected washer nozzle is difficult to obtain.

SUMMARY OF THE INVENTION

With the foregoing difficulties in view, it is an object of the present invention to provide a washer pump for automobiles which is capable of supplying a cleaning fluid reliably and efficiently to a selected one of two supply channels.

According to the present invention, there is provided a washer pump for an automobile, comprising: an impeller having a plurality of radial vanes circumferentially spaced at equal intervals; a substantially circular pump chamber receiving concentrically therein the impeller and having an inlet disposed in alignment with the center of the impeller and first and second outlets defined in a sidewall of the pump chamber and extending tangentially to the sidewall; a directional control valve including a valve chamber connected in fluid communication with the pump chamber through the first outlet and also through the second outlet, and a valve element movably disposed in the valve chamber for selectively connecting the first and second outlets, respectively, to first and second washer nozzles of the automobile; and a projection disposed between the first and second outlets and projecting inwardly from the sidewall of the pump chamber toward the impeller for substantially blocking the flow of a cleaning fluid between the first and second outlets.

Since the projection disposed between the first and second outlets substantially blocks the flow of the cleaning fluid between the two outlets, the pressure difference between the first and second outlets is increased with the result that the changeover operation of the valve can be achieved reliably in immediate response to the change in rotational direction of the impeller. A further advantage is that a leakage of the cleaning fluid from a non-selected washer nozzle can be prevented by the large pressure difference created between the first and second outlets.

The projection preferably has a width larger than the distance between two adjacent impeller vanes so as to prevent the cleaning fluid from flowing between the first and second outlets through a space between the adjacent vanes.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION

The present invention will be described hereinbelow in detail with reference to a preferred, but not limited, embodiment shown in the accompanying drawings.

Figure 1A:
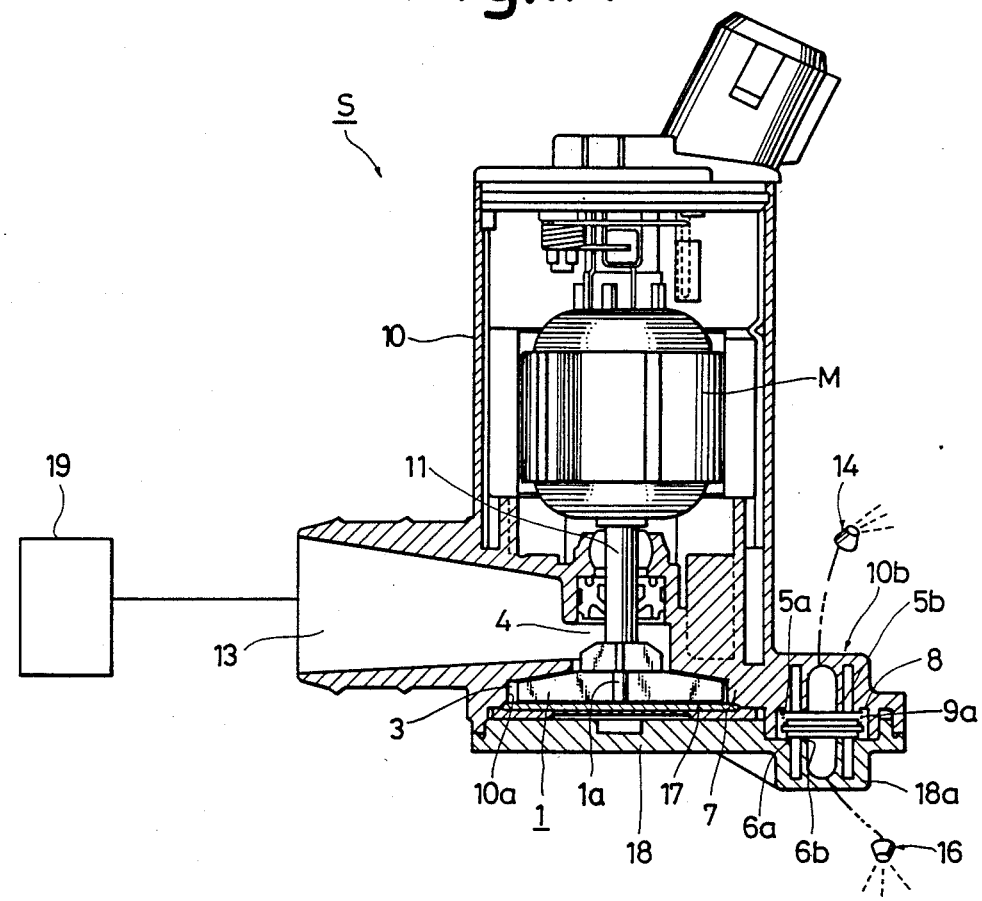
FIG. 1A is a schematic longitudinal cross-sectional view of a washer pump according to the present invention.
Figure 1B:
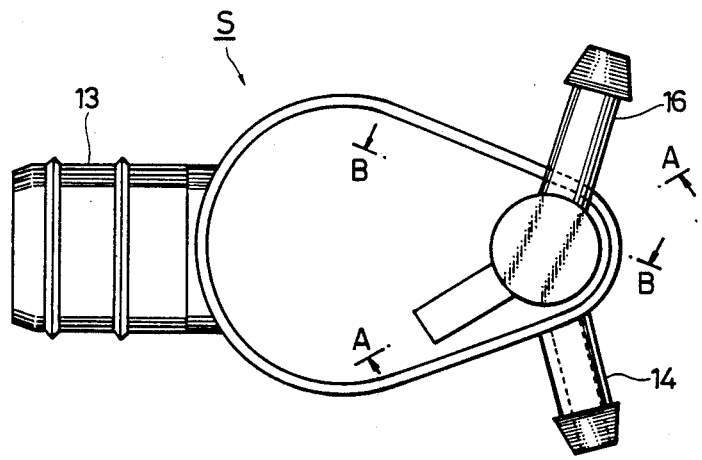
FIG. 1B is a bottom view of FIG. 1A.
Figure 1C:
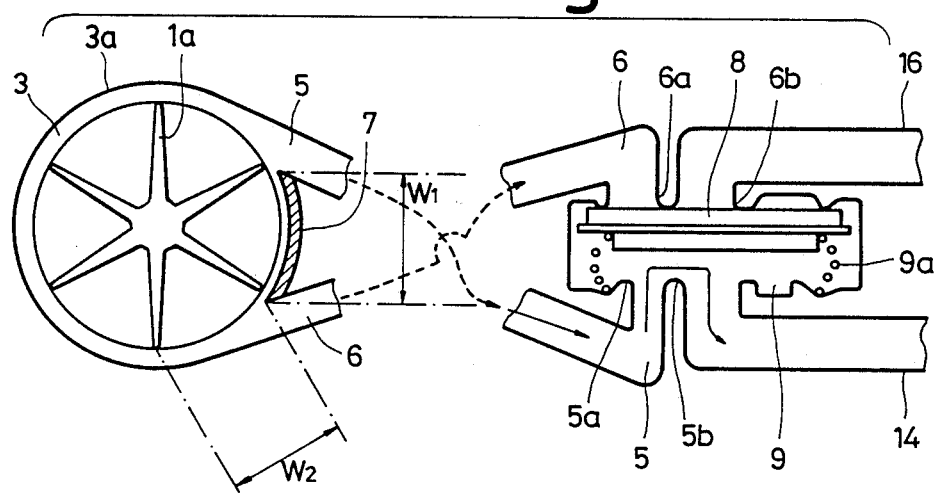
FIG. 1C is a diagrammatical view showing the relation between two pump outlets and a valve chamber of the washer pump.

As shown in FIGS. 1A and 1C, a washer pump S for automobiles generally comprises a housing 10, a drive motor M mounted in the housing 10, an impeller 1 secured to an output shaft 11 of the drive motor M and rotatably disposed in a pump chamber 3 defined in the housing 10, an inlet 4 and first and second outlets 5, 6 which are defined in the housing 10 and communicate with the pump chamber 3, and a projection 7 disposed between the first and second outlets 5, 6.

The drive motor M is a reversible motor which is rotatable in either direction. The impeller 1 which is mounted on the output shaft 11 of the reversible drive motor M is therefore rotatable in either direction within the pump chamber 3. The pump chamber 3 is of the centrifugal type having a substantially circular shape. The pump chamber 3 includes a circular recess 10a formed in a end face of the housing 10 and sealingly closed at its one end by an end plate 18 with a packing 17 disposed between the housing 10 and the end plate 18. The impeller 1 has a plurality of radial vanes 1a circumferentially spaced at equal intervals and is disposed concentrically in the circular pump chamber 3 with an annular clearance defined between the periphery of the impeller 1 and a sidewall 3a of the circular pump chamber 3, as shown in FIG. 1C. The first and second outlets 5, 6 are disposed at the same side of the pump chamber 3 with respect to the center of the circular pump chamber 3 and open tangentially to the sidewall 3a of the pump chamber 3. The sidewall 3a includes an integral arcuate projection 7 disposed between the first and second outlets 5, 6 and projecting inwardly therefrom toward the impeller 1 so as to partly reducing the clearance between the sidewall 3a of the pump chamber 3 and the impeller 1. The projection 7 has an arcuate surface extending parallel to the sidewall 3a and preferably has a width W1 which is larger than the distance W2 between two adjacent vanes 1a of the impeller 1. As shown in FIG. 1A, the inlet 4 is disposed at the center of the impeller 1 and connected in fluid circuit with a cleaning-fluid tank 19 through a inlet pipe 13 and a piping, not designated.

Figure 1D:
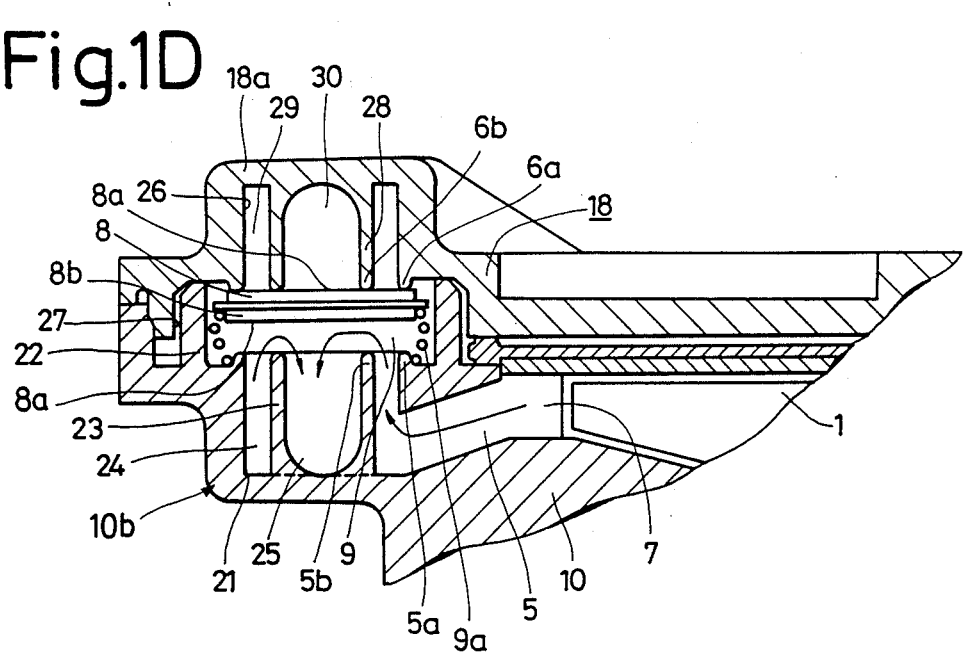
FIG. 1D is a cross-sectional view taken along line A—A of FIG. 1B.
Figure 1E:
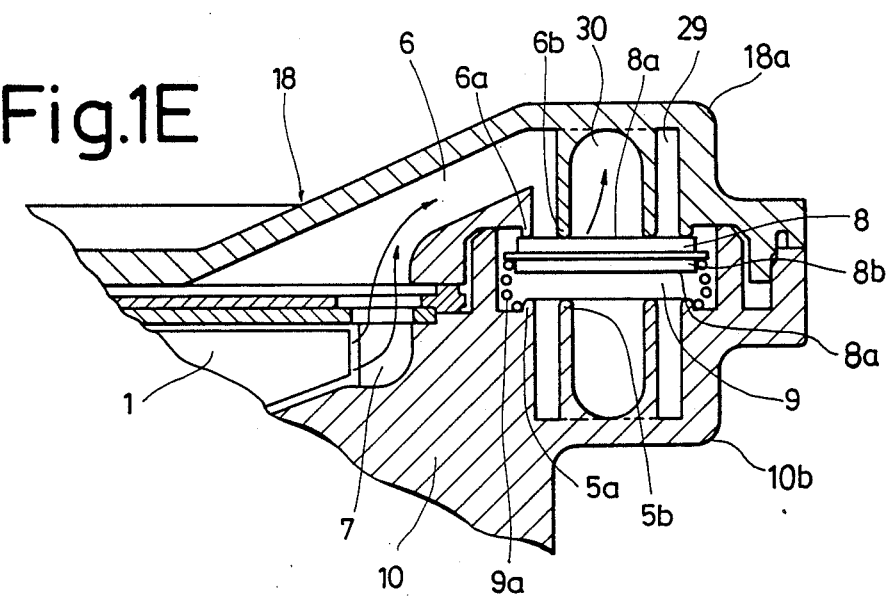
FIG. 1E is a cross-sectional view taken along line B—B of FIG. 1B.
Figure 1F:
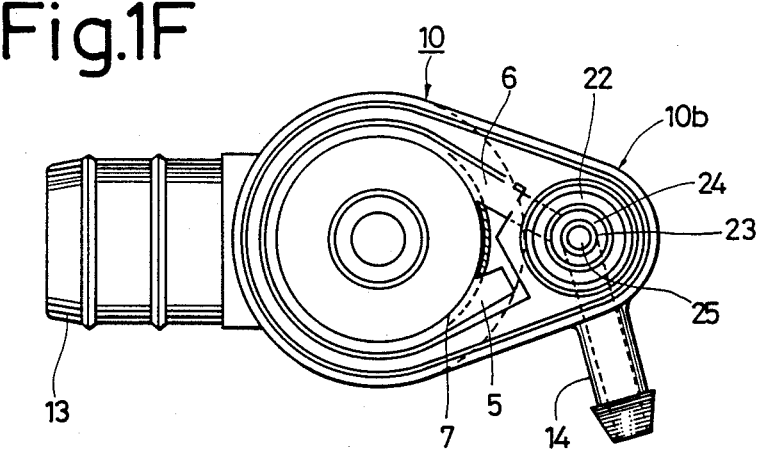
FIG. 1F is a bottom view of a casing of the washer pump.
Figure 1G:
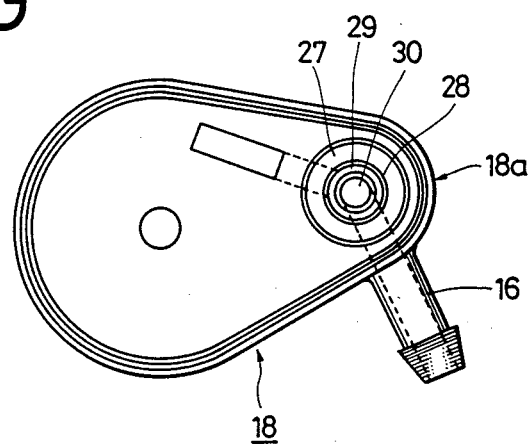
FIG. 1G is a plan view of an end plate of the washer pump.

As shown in FIG. 1C, the first and second outlets 5, 6 extend crosswise one another and they are connected in fluid circuit with a valve chamber 9 of a directional control valve disposed adjacent to the pump chamber 3. The valve chamber 9, as shown in FIG. 1A, is defined jointly by a recessed lateral projection 10b of the housing 10 and a lateral projection 18a of the end plate 18 that are assembled together with their recesses confronting one another. As shown in FIGS. 1D and 1E, the lateral projection 10b of the housing 10 has a circular stepped bore composed of a small-diameter inner recess 21 and a large-diameter outer recess 22. An annular partition wall 23 is disposed centrally in the inner recess 21 so as to define, between the partition wall 23 and the inner recess 21, an annular groove 24 extending outside the partition wall 23 and a central groove 25 disposed inside the partition wall 23. The annular groove 24 constitutes a first intake port of the valve chamber 9 while the central groove 25 constitutes a first discharge port of the valve 9 which is concentric with the first intake port as shown in FIGS. 1D and 1E. The first discharge port 25 is connected in fluid circuit with a first washer nozzle 14 (FIG. 1A) disposed adjacent to the windshield of a motor vehicle. Likewise, the lateral projection 18a of the end plate 18 has a circular stepped bore composed of a small-diameter inner recess 26 and a large-diameter outer recess 27. An annular partition wall 28 is disposed centrally in the inner recess 26 so as to define, between the partition wall 28 and the inner recess 26, an annular groove 29 extending outside the partition wall 28 and a central groove 30 disposed inside the partition wall 26. The annular groove 29 constitutes a second intake port of the valve chamber 9 while the central groove 30 constitutes a second discharge port of the valve chamber 9 which is concentric with the second intake port as shown in FIGS. 1D and 1E. The second discharge port 30 is connected in fluid circuit with a second washer nozzle (FIG. 1A) disposed adjacent to the rear window of the motor vehicle. The lateral projection 10b having the recesses 21, 22 and the lateral projection 18a having the recesses 26, 27 are engaged together to jointly form the valve chamber 9 and interconnect the valve chamber 9 and the first and second outlets 5, 6. The respective front edges of the recess 21 and the partition wall 23 lie flush with each other and constitute valve seats 5a, 5b facing the valve chamber 9. Likewise, the respective front edges of the recess 26 and the partition wall 28 lie flush with each other and constitute valve seats 6a, 6b facing the valve chamber 9.

A sealing valve elements 8 is movably disposed in the valve chamber 9. The valve element 8 is in the form of a flanged circular disc having at its opposite sides a pair of sealing surfaces 8a, 8a sealingly engageable with the valve seats 5a, 5b and the valve seats 6a, 6b, respectively, and a central annular flange 8b retaining one end of a compression coil spring 9a. The spring 9a acts between the housing 10 and the valve element 8 and urges the valve element 8 against the valve seat 6a, 6b to normally block the flow communication between the first intake port 29 and the first discharge port 30 of the valve chamber 9 so that the supply of a cleaning fluid to the second washer nozzle 16 does not take place in this valve position.

The washer pump S of the foregoing construction operates as follows. When the drive motor M is driven to rotate the impeller 1 clockwise in FIG. 1C, a cleaning fluid is led through the inlet 4 to the center of the rotating impeller 1; it is thrown out at high velocity through the impeller vanes 1a and into the clearance between the pump chamber 3 and the impeller vanes 1a. The high velocity cleaning fluid is forced out from the pump chamber 3 through the outlet 5 toward the valve chamber 9. Since the valve element 8 is normally urged in a direction to allow fluid communication between the first intake port 24 and the first discharge port 25 of the valve chamber 9 as shown in FIG. 1D, the cleaning fluid flows from the first intake port 24 into the valve chamber 9 and then is fed from the valve chamber 9 through the first discharge port 25 to the first washer nozzle 14 (FIG. 1A) without causing substantial pressure drop. The cleaning fluid is finally ejected from the washer nozzle 14 against the non-illustrated windshield for cleaning the same.

Figure 2A:
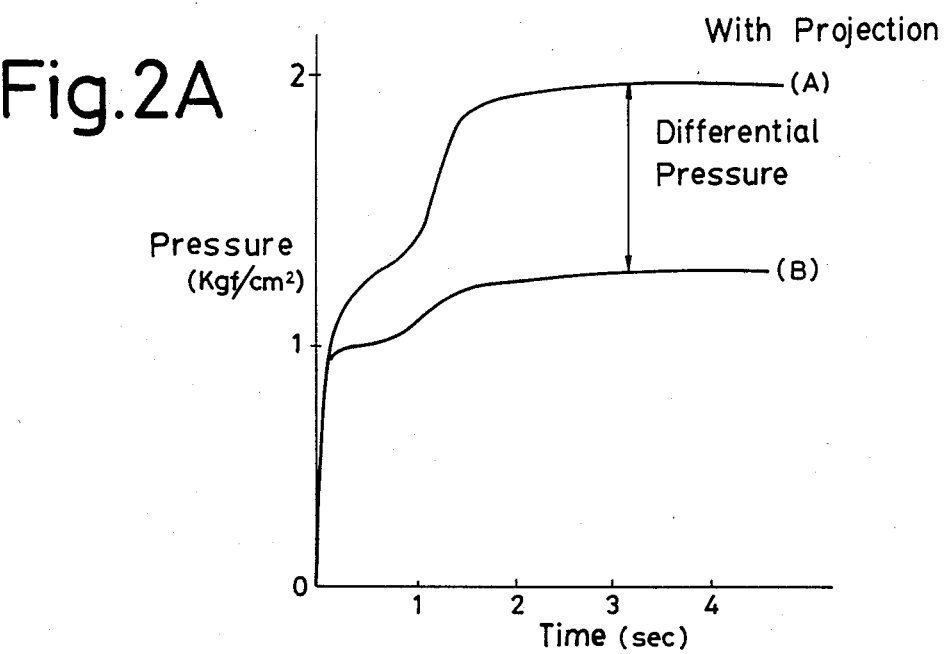
FIG. 2A is a graph showing the pressure characteristic of the washer pump according to the present invention.
Figure 2B:
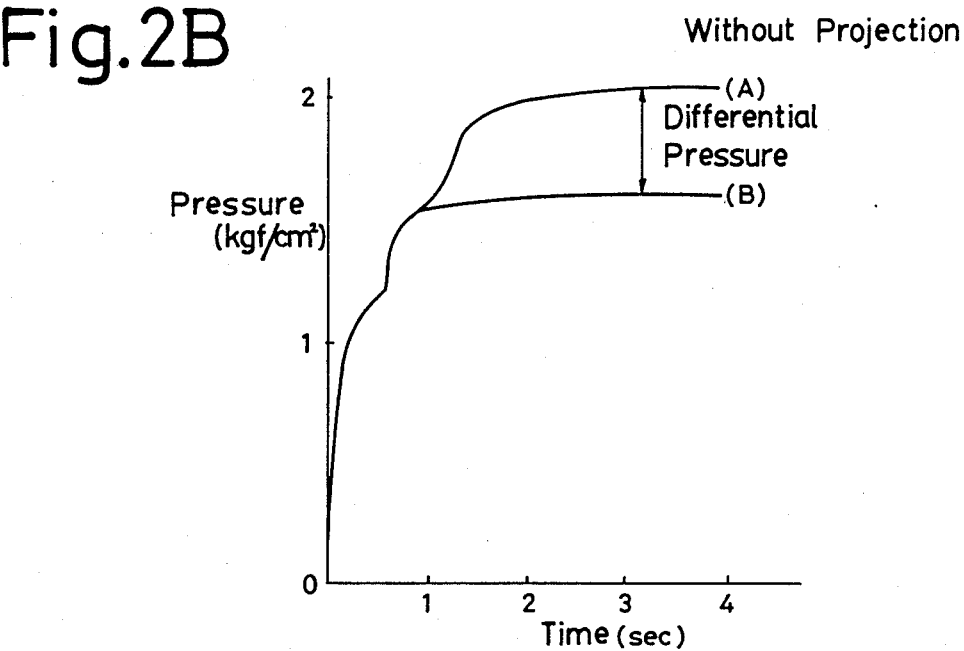
FIG. 2B is a graph showing the pressure characteristic of a conventional pump.

According to an important feature of the present invention, the arcuate projection 7 provided between the first and second outlets 5, 6 serves as a baffle to substantially block the flow of the cleaning fluid between the first and second outlets 5, 6, thereby increasing the pressure difference between the first and second outlets 5, 6. A comparative test was made between the washer pump S of the present invention and a comparative washer pump devoid of the projection 7, other structural details of the comparative washer pump being the same as those of the inventive washer pump S. The pressure of the cleaning fluid was measured at the first and second outlets 5, 6, respectively, when the impeller 1 of each of the inventive and comparative washer pumps was rotated clockwise in FIG. 1C with the results shown in FIGS. 2A and 2B. In each of FIGS. 2A and 2B, a curve indicated by reference character (A) represents the positive pressure of the cleaning fluid measured at the first outlet 5 and a curve indicated by reference character (B) represents the positive pressure of the cleaning fluid measured at the second outlet 6. As evidenced by FIG. 2A, the inventive washer pump S having the projection 7 created a differential pressure between the first and second outlets 5, 6 in immediate response to the start of the washer pump S and the differential pressure increased to a maximum value of about 0.8 Kgf/cm$^2$. On the other hand, as shown in FIG. 2B, a differential pressure in the comparative washer pump was created only after elapsing of more than one second counted from the start of the washer pump and the maximum differential pressure was about 0.4 Kgf/cm$^2$. With the projection 7 thus provided, the pressure difference between the first and second outlets 5, 6 was increased to two times as large as the pressure difference obtained when omitting the projection 7. With this large pressure difference, the valve element 8 can be operated rapidly and reliably so that the cleaning fluid is discharged from the selected one of the first and second washer nozzles 14, 16 without causing objectionable leakage from the non-selected washer nozzle. Since the width of the projection 7 is larger than the distance between the adjacent impeller vanes 1a as described above, the flow of the cleaning fluid between the first and second outlets 5, 6 through a space between two adjacent vanes 1a can be substantially blocked.

When the drive motor M is driven to rotate the impreller 1 counterclockwise in FIG. 1C, the cleaning fluid is forced to flow from the pump chamber 3 through the second outlet 6 toward the valve chamber 9. The pressurized cleaning fluid flows into the second intake port 29 and then urges the valve element 8 toward the valve seats 5a, 5b against the force of the spring 9a. When the pressure acting on the valve element 8 exceeds the force of the spring 9a, the valve element 8 is disengaged from the valve seats 6a, 6b whereupon the cleaning fluid flows into the valve chamber 9 and then is fed therefrom through the second discharge port 30 toward the second washer nozzle (FIG. 1A). During that time, the pressure of the cleaning fluid is lowered to a certain extent, however, the pressure drop is negligible when the second washer nozzle 16 is disposed adjacent to the upper edge of the rear window, not shown, so as to eject the cleaning fluid downwardly against the rear window. Conversely, the cleaning fluid ejected from the first washer nozzle 14 has the same pressure as imparted when the cleaning fluid leaves the pump chamber 3 into the first outlet 5.

According to the present invention, the pressure difference created between the first and second outlets 5, 6 is considerably large and hence it is possible to use a non-spring-loaded valve element floatingly disposed in the valve chamber 9, instead of the spring-loaded valve element 8.

Obviously, various modifications and variations of the present invention are possible in the light of the above teaching. It is therefore to be understood that within the scope of the appended claims the invention may be practiced otherwise than as specifically described.

What is claimed is:

1. A centrifugal washer pump for an automobile for supplying a cleaning fluid selectively to first and second washer nozzles of the automobile, comprising:
   (a) an impeller having a plurality of radially extending vanes circumferentially spaced at equal intervals;
   (b) a substantially circular centrifugal pump chamber receiving concentrically therein said impeller and having an inlet disposed in alignment with a central axis of said impeller for supplying the cleaning fluid to the center of said impeller, and first and second outlets defined in a sidewall of said centrifugal pump chamber and extending tangentially to said sidewall, said first and second outlets being subjected to different positive pressures when said impeller is rotating;
   (c) a directional control valve including a valve chamber connected in fluid communication with said pump chamber through said first outlet and also through said second outlet, and a valve element movably disposed in said valve chamber for selectively connecting said first and second outlets, respectively, to the first and second washer nozzles; and
   (d) a projection disposed between said first and second outlets and projecting inwardly from said sidewall of said centrifugal pump chamber toward said impeller for substantially blocking the flow of the cleaning fluid between said first and second outlets to thereby increase the pressure difference between said first and second outlets.

2. A centrifugal washer pump according to claim 1, wherein said projection has a width which is larger than the distance between two adjacent impeller vanes.

3. A centrifugal washer pump according to claim 1, wherein said projection is integral with said sidewall.

4. A centrifugal washer pump according to claim 1, wherein said projection is arcuate and extends parallel to said sidewall.

5. A centrifugal washer pump according to claim 1, wherein said first and second outlets are disposed on the same side of said centrifugal pump chamber and extending convergently toward said valve chamber.

6. A centrifugal washer pump according to claim 1, wherein said valve chamber has first and second annular intake ports located opposite one another in said valve element and connected respectively with said first and second outlets, and first and second discharge ports located opposite one another in said valve element and connected respectively to the first and second washer nozzles, said first and second annular intake ports being concentric with said first and second discharge ports and disposed circumferentially around said first and second discharge ports, respectively.

* * * * *